July 15, 1969     L. A. KREIDER     3,455,196
NOTCHING MACHINE

Filed Aug. 8, 1967     3 Sheets-Sheet 1

INVENTOR.
LLOYD A. KREIDER
BY
Woodhams, Blanchard, Flynn
ATTORNEYS

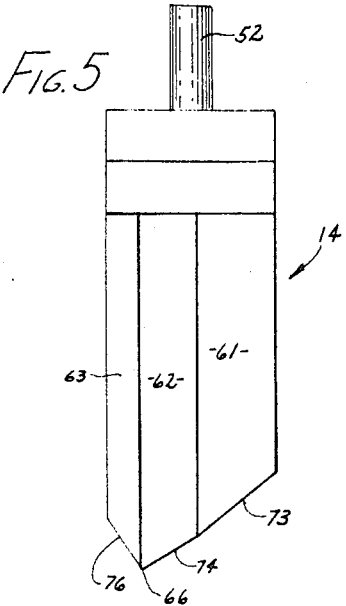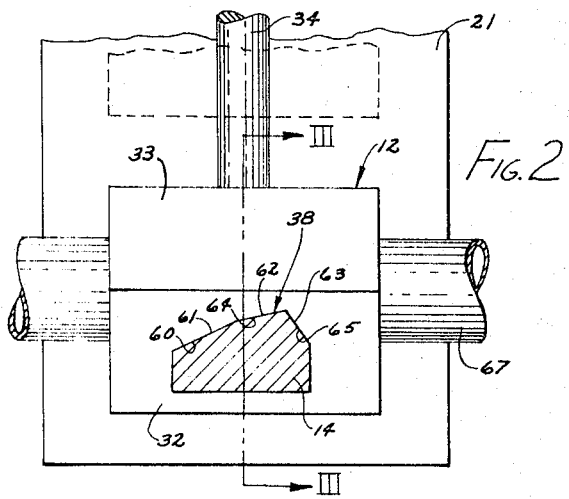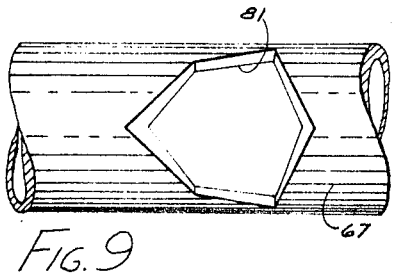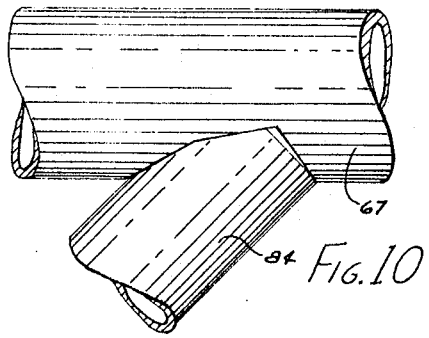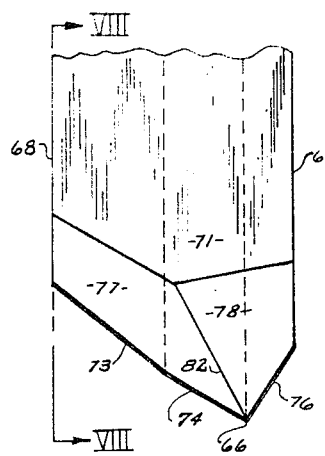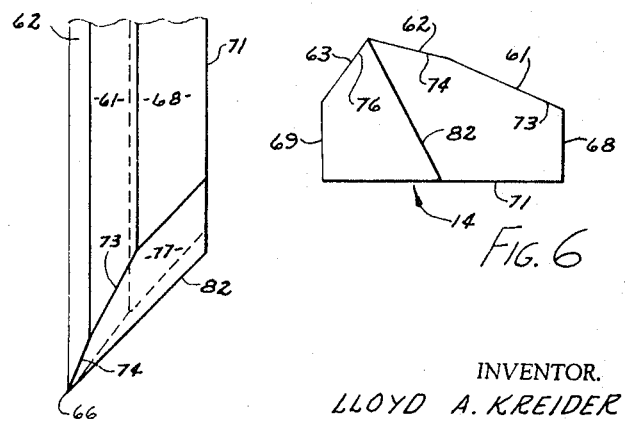

July 15, 1969 L. A. KREIDER 3,455,196
NOTCHING MACHINE
Filed Aug. 8, 1967 3 Sheets-Sheet 3
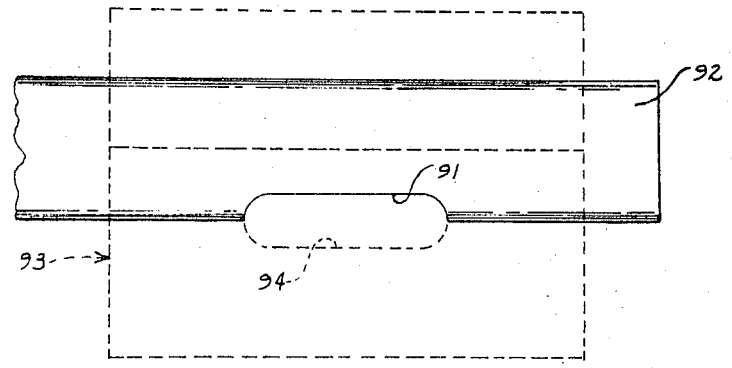
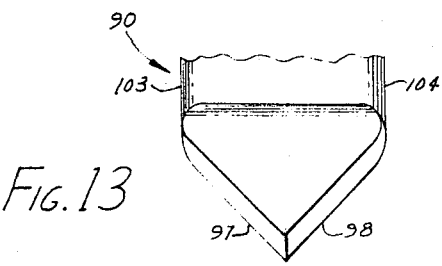
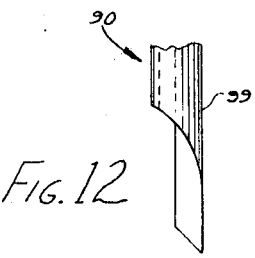
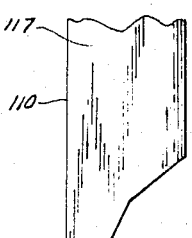
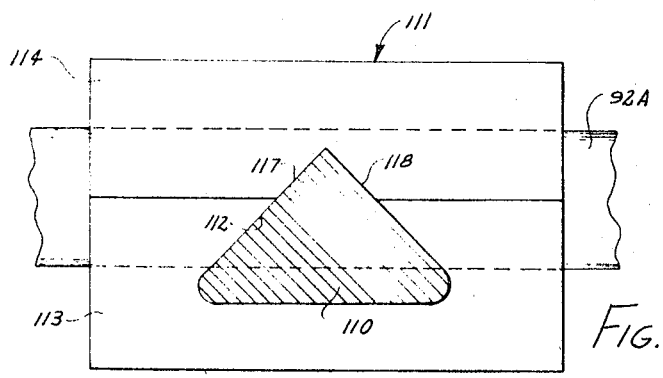
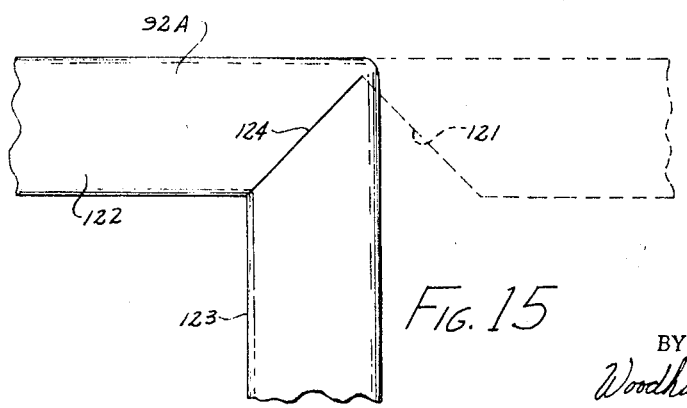
INVENTOR.
LLOYD A. KREIDER
BY
Woodhams, Blanchard & Flynn
ATTORNEYS

United States Patent Office 3,455,196
Patented July 15, 1969

3,455,196
NOTCHING MACHINE
Lloyd A. Kreider, 608 Devonshire Drive,
Sturgis, Mich. 49091
Filed Aug. 8, 1967, Ser. No. 659,229
Int. Cl. B26d 7/02; B26f 1/00
U.S. Cl. 83—454                                5 Claims

ABSTRACT OF THE DISCLOSURE

A C-shaped frame structure supporting a tool for movement toward and away from a die both of which are specifically designed for cutting notches in tubular stock. The die is arranged in two parts which snugly embrace and completely surround that portion of the tubular stock in which the notch is to be cut. One portion of the die has an opening for guiding the tool which has at least two flat side walls and is preferably solid and pointed at its cutting end.

Field of the invention

This invention relates in general to a machine tool and, more particularly, to a type thereof capable of cutting notches in elongated, tubular elements.

Description of the prior art

The notching machine and tooling therefor, which are described hereinafter, were developed out of the machine disclosed in my Patent No. 3,120,143. In the course of using this earlier machine, it was found that acute angle connections between two tubular members required accurate cutting not only of the notch in the side wall of one of the tubular members, but also a special cut at the end of the abutting tubular member.

In addition, it was found difficult at times to hold the abutting tubular member in position with the notched tubular member as they were being welded. Often, however, insofar as the ultimate use of the junction was concerned, the special cut at the end of the abutting tubular member was not needed. Moreover, if the notched tubular member was provided with an opening into which the end of the abutting tubular member could be at least partially inserted, then the welding and positioning problems would be greatly reduced. That is, after being inserted substantially into the notch in the second tubular member, the first tubular member could then be welded in place with relative ease. However, the main problem was to provide a notch of such shape that the abutting member could be inserted into such notch at a small acute angle.

However, existing tools, including the tool disclosed in my aforesaid patent, could not provide the type of notch in the second tubular member which would permit such insertion of the end of the adjoining first tubular member where a relatively sharp acute angle exists between the two tubular members. Attempts were made to provide a punch having an oval-shaped cross section whereby the desired type of opening could be provided in the side wall of a tubular member. However, it was almost impossible to provide a satisfactory tool of this shape because of the problems of matching such a tool with a die and thereafter maintaining a sharpened edge on such a tool. That is, while such a tool arrangement could be produced, the initial cost and the maintenance cost would be almost prohibitive.

In the course of considering this problem, it was recognized that, according to theories of analytical geometry, the desired shape could be approached by providing a series of flat walls on a tool and thus it would be at least feasible to provide a flat walled punch which could be readily sharpened with the usual facilities available in a tool room. It was also discovered that punches and dies of this type could be used on tubular members of rectangular cross section, as well as on members of circular or oval cross section.

Accordingly, a primary object of this invention has been the provision of a notching machine having a sturdy construction capable of supporting punch and die means for cutting a notch in one tubular member, without crushing or disfiguring the tubular member, so that another tubular member can be satisfactorily connected with the notched member at a relatively sharp acute angle by means of a minimum of welding.

A further object of this invention has been the provision of a notching machine, as aforesaid, capable of performing notching operations heretofore unavailable with existing machines for substantially the same purposes; and wherein the abutting tubular member can be inserted slightly into the notched tubular member.

Other objects and purposes of this invention will become apparent to persons familiar with this type of equipment upon reading the following descriptive material and examining the accompanying drawings, in which:

FIGURE 2 is a sectional view taken along the line II—II in FIGURE 1.

FIGURE 5 is a front elevational view of a punch according to the invention.

FIGURE 6 is a bottom view of the punch appearing in FIGURE 5.

FIGURE 7 is a fragment of a rear elevational view of the punch shown in FIGURE 5.

FIGURE 8 is a fragment of a side view of the punch appearing in FIGURE 7 as viewed from the cutting line VIII—VIII therein.

FIGURE 9 is a side view of a notched tubular member.

FIGURE 10 is a fragment of a pair of tubular members, one of which has been cut as shown in FIGURE 9, after they are interconnected.

FIGURE 11 is a portion of a tubular member having a substantially square cross section and notched on one side thereof by means including the die shown in broken lines.

FIGURE 12 is a fragment of a side view of a punch used with the die shown in FIGURE 11.

FIGURE 13 is a fragment of the rear view of the punch appearing in FIGURE 12.

FIGURE 14 is a fragment of a tubular member having a rectangular cross section disposed within a die for notching said tubular member.

FIGURE 15 is a fragment of a tubular member having a rectangular cross section after it has been notched by the die appearing in FIGURE 14 and then bent into a right angle.

FIGURE 16 is a fragment of a side view of a punch used with the die shown in FIGURE 14.

Detailed description

Figure 1:
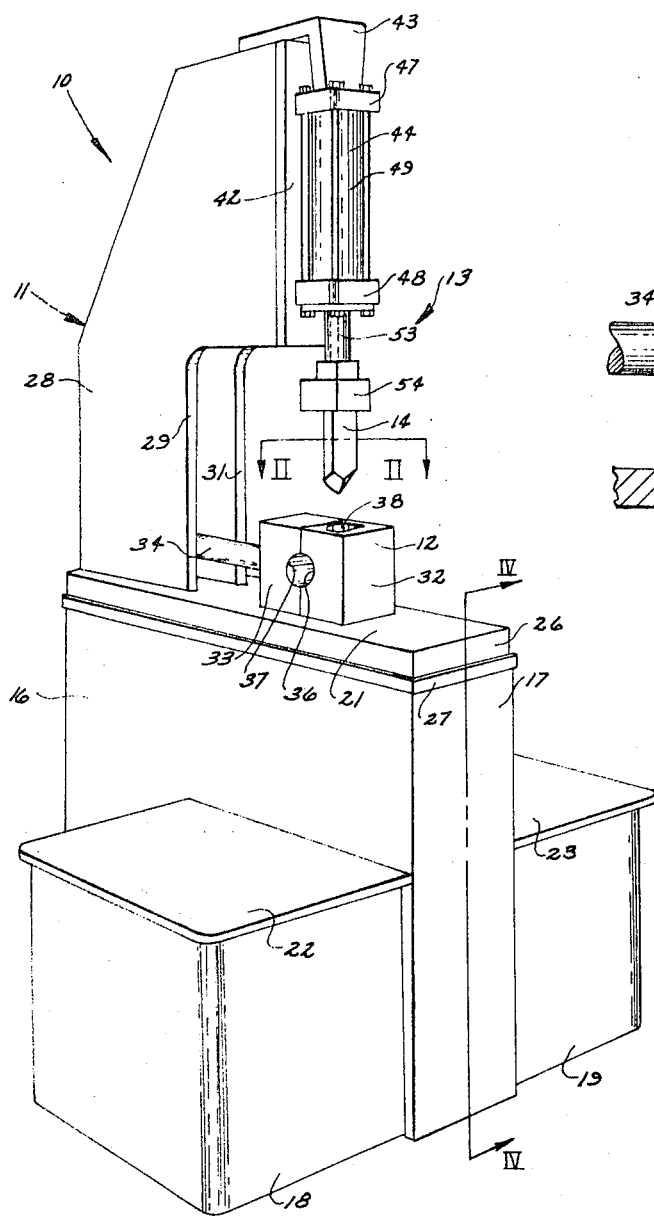
FIGURE 1 is a perspective view of a machine embodying the invention.

For convenience in description, the terms "upper," "lower," "front," "rear" and words of similar import will have reference to the machine of the invention as appearing in FIGURE 1. The terms "inner," "outer" and derivatives thereof will have reference to the geometric center of said machine and parts thereof.

The machine 10, a preferred embodiment of which is illustrated in FIGURE 1, is comprised of a frame 11, upon which the die 12 and the power-driven tool holder 13 are supported. A punch 14 is drivingly engaged with the tool holder 13.

Figure 4:
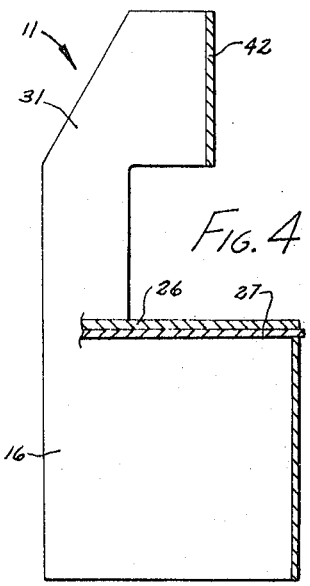
FIGURE 4 is a central cross-sectional view of the machine substantially as taken along the line IV—IV in FIGURE 1.

The C-shaped frame 11 (FIGURES 1 and 4) includes a base 16 having a central portion 17 to which is integrally attached a pair of side portions 18 and 19 for stability and convenience. The central base portion 17 has a work-supporting member 21 comprised of an upper plate 26 and a lower plate 27. The side portions 18 and 19 are provided with upper surface members 22 and 23, respectively, on which work materials or tools may be supported. The surface members 21, 22 and 23 may be secured in their respective positions by conventional means such as bolting or welding. The frame 11 also includes an upper frame portion 28 which includes the upper parts of a pair of vertical, substantially parallel and C-shaped frame plates 29 and 31, which are interconnected by the upper front plate 42 to provide stability and a rigid mounting means for the tool holder 13. The entire frame structure 11 may be constructed of flat steel plate and steel bar stock. Also, the lower parts of the frame plates 29 and 31 support the member 21, as shown in FIGURE 4.

The pipe vise 12, which is supported on the member 21, includes a front or die member 32 stationarily but removably positioned on member 21 and a rear or clamping member 33 reciprocally driven by the connecting rod 34 along the member 21. Rod 34 may be powered by a means (not shown), such as a pneumatic or hydraulic cylinder. The front member 32 and the rear member 33 are provided with semicylindrical grooves 36 and 37, respectively, for reception of the tubular stock which is to be notched. The front member 32 is also provided with a vertically disposed tool guide opening 38 described hereinafter.

Figure 3:
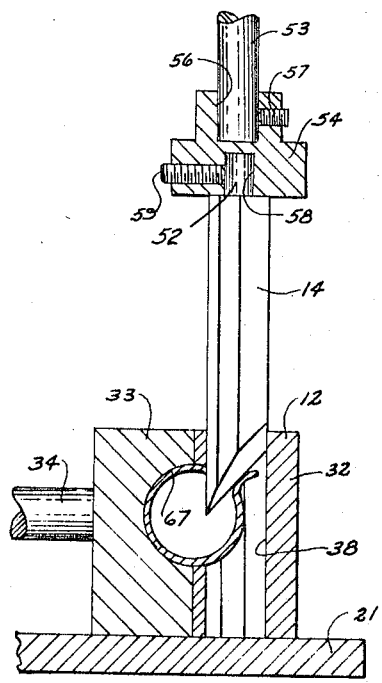
FIGURE 3 is a sectional view taken along the line III—III in FIGURE 2.

One end of an L-shaped bracket 43 (FIGURE 1) is securely mounted to the upper end of frame 11, such as by welding to the front plate 42 and/or the frame plates 29 and 31. The powered tool holder 13 is attached to the mounting bracket 43 and is comprised of a pneumatic or hydraulic cylinder 44 which has an actuating rod 53. A chuck 54 (FIGURE 3), which is secured to the lower extremity of rod 53, has in its upper portion a hole 56 into which said rod 53 may extend and be removably secured, as by the lock screw 57. Chuck 54 has a hole 58 in its lower portion in which the stem 52 on the punch 14 is received and then held by the locking screw 59.

The punch 14 (FIGURES 5-8) is formed from solid bar stock and has a plurality, here six, of substantially flat faces or walls. Although the number of faces and relative sizes of each may be varied to produce the desired shape and size of cut, this embodiment has three faces 61, 62 and 63 with cutting edges 73, 74 and 76, respectively, which may be sharpened on conventional grinding devices. Said punch 14 in addition has three noncutting sides 68, 69 and 71 which act to guide and stabilize the punch 14 as it is urged through the opening 38 in die 12 by the tool holder 13. The entire lower end of the punch 14 converges toward a sharp point 66 (FIGURES 7 and 8) which is capable of piercing the tubular stock 67 and which is located at the junction of the edges 74 and 76.

The guide opening 38 in the front member 32 of the pipe vise 12 has guide walls 60, 64 and 65 (FIGURE 2) which are snugly and slideably engaged by the walls 61, 62 and 63, respectively, of the punch 14 as it moves through the opening 38. The angular edge of the notch 81 (FIGURES 9 and 10), which is provided in the tubular member 67 by the punch 14, approaches a curve of the desired shape for a close fit with a second tubular member 84 abutting the tubular member 67.

A sharp angle between the cutting edges 74 and 76 (FIGURE 7) is desired to increase the piercing quality of the point 66. This is achieved by providing on the lower end of the punch 14 a pair of lower surfaces 77 and 78 which converge downwardly and rearwardly to meet along the line 82.

Contrary to the teachings in this field, a punch 14 having cutting edges 73, 74 and 76 with a Rockwell hardness of 5200 will hold its cutting edge for longer periods of use than punches having much harder cutting edges, provided that a relatively small flat (approximately one thirty-second of an inch wide) is provided on the downwardly facing portion of said cutting edges 73, 74 and 76. Where a harder, sharpened cutting edges is provided, chipping occurs and the actual cut made by such edge in the steel pipe is no better.

Operation

Although the operation of the pipe notching machine 10 has been indicated above, further details will now be given for a more complete understanding of the invention. To operate machine 10, the rear member 33 of the die 12 is withdrawn from its solid line position (FIGURE 2) adjoining the front member 32 to its broken line position, as by activating a pneumatic or hydraulic cylinder (not shown) which is attached to the connecting rod 34. A piece of tubular stock 67 may then be inserted between the front member 32 and the rear member 33, said tubular stock being held in the two semicylindrical grooves 36 and 37 as rear member 33 is caused again to move tightly against front member 32. The actuating cylinder 44 is now activated to cause connecting rod 53 to move punch 14 into hole 38 contacting and piercing said tubular stock 67. The cylinder 44 may then be reversed causing punch 14 to be retracted from hole 38. The member 33 may then be caused to move rearward thereby releasing tubular stock 67 for removal of same and repetition of the operation. Should one desire to remove punch 14 for sharpening or replacement, set screw 59 may be loosened and punch 14 will easily slide out.

Modifications

A modified punch 90 (FIGURE 13) is especially designed for cutting a notch 91 (FIGURE 11) in the side wall of a rectangular tubular member 92 which is clamped between the two halves of a pipe vise having a guide opening 94 in the die member 96 of said pipe vise 93. The lower end of the punch 90 is provided with converging and beveled cutting edges 97 and 98 which are flush with the rear side 99 of said punch (FIGURE 12). The front side 102 of the punch 90 may be connected to the rear side 99 by a pair of smoothly curving surfaces 103 and 104.

The notch 91 is such that another rectangular tube can be abutted with the tubular member 92 in registration with the notch 91 for subsequent welding to provide a substantially T-shaped joint. Such tubing may be at a right angle relationship or at a small acute angular relationship, as desired. Moreover, the abutting tube can be inserted slightly into the notched tube for further strength, particularly where the joint is made for structural strength in a support frame, for example, rather than for fluid communication purposes.

In a further modification of the invention disclosed in FIGURES 14, 15 and 16, the punch 110 has a substantially triangular cross section and the pipe vise 111 has a corresponding triangular guide opening 112, which extends into both the front and rear members 113 and 114, respectively, thereof. The guide opening 112 is arranged so that the pointed tip 116 of the punch 110 is closely adjacent the inner surface of the rear wall of the tubular member 92A as the punch cuts through the tubular member held by the vise. The converging side walls 117 and 118 are sharpened along their lower edges to shear through the tubular member 92A and thereby provide the triangular notch 121, as shown in FIGURE 15. The two parts 122 and 123 of the tubular member 92A on opposite sides of the notch 121 are then bent toward each other until the notch 121 is reduced to a seam 124 along which a weld is provided to hold the tubular member in this angular position.

The embodiments of the invention in which an exclusive property or privilege is claimed are defined as follows:

1. In a device for producing notches in a portion of an elongated rigid element, said device having vise means for snugly embracing and holding said portion of said rigid element and tool-gripping means relatively movable toward and away from said vise means, the combination comprising:
    punch means having a plurality of flat, contiguous side walls arranged to define a uniform cross-sectional length of said punch means, one end of said punch means being adapted for engagement by said tool-gripping means, said side walls having sharpened edges at the other end of said punch means converging to a point at one end of the meeting line between two adajcent side walls; and
    die means in said vise means having wall means defining an opening adapted to receive said punch means and guide it into engagement with said portion of an element held by said vise means.

2. A notching device according to claim 1, wherein said portion of said rigid element is tubular; and
    wherein said punch means has six flat side walls, at least three thereof having said sharpened edges, and two of said sharpened edges being on opposite sides of said point.

3. A device according to claim 2, wherein each side wall having a sharpened edge defines a plane disposed at an obtuse angle with respect to the plane defined by an adjacent wall having a sharpened edge; and
    wherein the sharpened edges on the side walls adjacent said meeting lines are disposed at an included angle not materially in excess of 90 degrees.

4. A structure according to claim 2, wherein two of said side walls are substantially parallel, wherein a third side wall extends prependicularly between corresponding edges of said parallel side walls, and the other three side walls have said sharpened edges.

5. A device according to claim 4, wherein the die opening in said vise means is defined by six flat walls arranged to conform substantially exactly with the side walls on said punch means for snug engagement therewith, said vise means having an opening in which the portion of the element is snugly received and which intersects said opening of said die means.

References Cited

UNITED STATES PATENTS 3,120,143  2/1964  Kreider _____ 83—454

JAMES M. MEISTER, Primary Examiner

U.S. Cl. X.R.

83—693, 917